United States Patent [19]

Makino et al.

[11] Patent Number: 4,828,696
[45] Date of Patent: * May 9, 1989

[54] WATER AERATION APPARATUS

[75] Inventors: Hisao Makino; Masahiko Makino, both of Ichikawa, Japan

[73] Assignee: Kaiyo Kogyo Kabushiki Kaisha, Tokyo, Japan

[*] Notice: The portion of the term of this patent subsequent to Oct. 27, 2004 has been disclaimed.

[21] Appl. No.: 33,464

[22] Filed: Apr. 2, 1987

Related U.S. Application Data

[63] Continuation of Ser. No. 717,292, Mar. 28, 1985, Pat. No. 4,702,830.

[30] Foreign Application Priority Data

Apr. 23, 1984 [JP] Japan .................................. 59-59614

[51] Int. Cl.$^4$ ................................................. C02F 7/00
[52] U.S. Cl. ..................................... 210/220; 210/170; 261/77; 261/124
[58] Field of Search ................... 210/170, 220; 261/77, 261/124

[56] References Cited

U.S. PATENT DOCUMENTS

| | | | |
|---|---|---|---|
| 3,246,761 | 4/1966 | Bryan et al. | 261/77 |
| 3,592,450 | 7/1971 | Rippon | 261/123 |
| 3,628,775 | 12/1971 | McConnell et al. | 261/77 |
| 3,852,384 | 12/1974 | Bearden | 261/77 |
| 4,169,873 | 10/1979 | Lipert | 261/77 |
| 4,187,263 | 2/1980 | Lipert | 261/77 |
| 4,356,131 | 10/1982 | Lipert | 261/77 |
| 4,436,675 | 3/1984 | Hisao et al. | 261/120 |
| 4,569,804 | 2/1986 | Murphy | 261/77 |

FOREIGN PATENT DOCUMENTS 47-21461 11/1972 Japan .
58-23698 2/1983 Japan .

Primary Examiner—Tom Wyse
Attorney, Agent, or Firm—Wenderoth, Lind & Ponack

[57] ABSTRACT

A water aeration apparatus is used for aeration purposes in the water-filled areas such as dams, impounded water or reservoirs, and lakes and marshes, and includes a tubular casing and supply chamber that causes large quantities of water to be exposed to the flotation action of air supplied under pressure, thus raising the water up to the surface. The apparatus may be used for water purification, or for anti-freezing purposes particularly in cold climate regions. The apparatus includes a collective tubular casing and a multiple-partitioned or common air supply chamber below the casing, the tubular casing including a plurality of tubular air and water passages formed by dividing the interior of the casing into several longitudinal passages or by combining individual tubes together.

4 Claims, 10 Drawing Sheets

4

5

6

7

8

9

10

11

WATER AERATION APPARATUS

This application is a Continuation of Application Ser. No. 717,292 filed on Mar. 28, 1985, U.S. Pat. No. 4,702,830.

BACKGROUND OF THE INVENTION

1. Field of the Invention

The present invention relates to a water aeration apparatus, more particularly to an aeration apparatus which takes advantage of the raising, flotation or suction action of air under pressure for causing a large amount of water to be exposed to that action for aeration purposes or water purification as well as anti-freezing purposes in water-filled areas such as dams, impounded water or reservoirs, and lakes and marshes.

2. Description of the Prior Art

A conventional water aeration apparatus of the type using the raising or suction action of air supplied under pressure to the water has been used for aeration purposes in dams, impounded water, reservoir installations or natural water resources such as lakes and marshes, and is known to provide an effective means for that purpose (as disclosed in the Japanese Utility Model Official Publication as opened to the public examination under No. 57 (1982)-39117).

The conventional apparatus includes a tubular casing, which has a single passage through which water is pumped upwardly by its exposure to the action of air supplied under pressure, and the passage has a bore diameter range of 40 cm to 50 cm. Because of the single water passage construction, the single tubular casing has limitations in its capacity for handing water at a time. When this apparatus is used in a dam installation or elsewhere which contains water to a depth of for example 20 m or more, each tubular casing is required to be installed for one million volumetric tons of water to be handled. Therefore, it is necessary to increase the number of the individual tubular casing installations as the volume of water to be handled increases.

It should readily be understood from the above that for a single passage tubular casing, ten tubular casing installations are required for handling ten million volumetric tons of water, and one hundred installations are required for one hundred million tons of water, which can easily be found from the simple calculation. A corresponding number of additional installations are required for additional tons of water. Increasing the number of individual tubular casing installations results in additional pieces of accompanying equipment such as air supply hoses, air compressors, and motors, in addition to which require regular or occasional maintenance service. This raises a problem to be solved. As one solution, it may be suggested that the number of individual tubular casing installations be reduced by increasing the transverse cross section or bore diameter of a single tubular casing. Increasing the diameter, however, leads to a considerable increase in the volumetric capacity of an air chamber which is located below the tubular casing. The volume of such air chamber may be found from the following equation, for example:

$$V = k \frac{4}{3} \pi r^3$$

where k is a factor of 0.3 to 1.0, r is a radius of a tubular casing, and V is the volume of an air chamber.

It can be seen from the above equation that the volume of the air chamber increases in proportion to the cube of the radius of the tubular casing. Thus, increasing the diameter for the tubular casing poses a problem since it requires a larger air supply. This is undesirable from the energy saving needs.

SUMMARY OF THE INVENTION

In order to solve the problems mentioned above, it is therefore one object of the present invention to offer a single tubular casing construction that includes a number of smaller diameter tubular passages required to provide a total diametrical cross section as indicated in the above equation.

Specifically, in its one form, the collective tubular casing according to the present invention comprises a number of individual tubes or pipes (for example, two to ten) having a smaller bore diameter (such as 30 cm to 50 cm, for example), and below those tubes a multiplepartitioned air chamber for each of the tubes or a common air chamber for all the tubes. Thus, the single tubular casing, which is installed at one site, can handle more water to be pumped up for the aeration purpose. In another variation, a large bore-diameter tubular casing may be divided internally to provide a plurality of longitudinal tubular passages.

BRIEF DESCRIPTION OF THE DRAWINGS

Those and other objects and features of the present invention will become apparent from the detailed description of several preferred embodiments that follows with reference to the accompanying drawings, in which:

FIG. 9 shows the configuration which also includes six tubes which are arranged in a circle, and FIG. 10 shows nine tubes arranged in three rows.

DETAILED DESCRIPTION OF THE PREFERRED EMBODIMENTS

Figure 1:
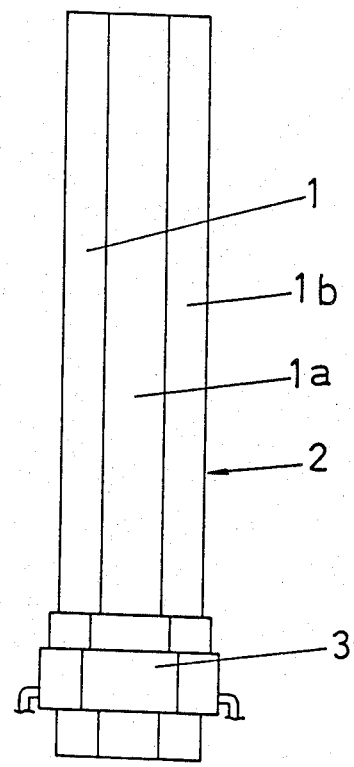
FIG. 1 is a front elevation of one form of the collective tubular casing embodying the present invention, which is constructed from individual tubes or pipes.
Figure 2:
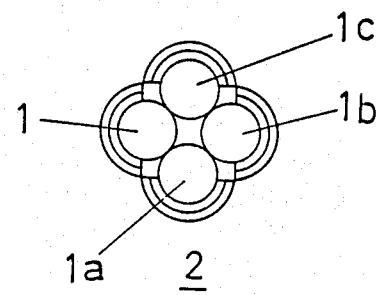
FIG. 2 is a plan view of the construction shown in FIG. 1.
Figure 3:
FIGS. 3 through 10 illustrate the different configurations as seen from the plan view, each of which includes a different number of small diameter tubes which are arranged differently: specifically, the configuration in FIG. 3 includes two tubes, the one in FIG. 4 includes three tubes arranged in a triangular form, the one in FIG. 5 includes five tubes arranged in a pentagonal form, the one in FIG. 6 shows the pentagonal arrangement including one center tube and five surrounding tubes, the one in FIG. 7 is configured to include six tubes which in this case are arranged in a triangular form, the one in FIG. 8 also includes six tubes which are arranged in two rows.
Figure 4:
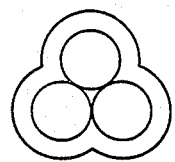
Figure 5:
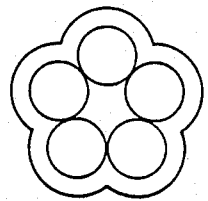
Figure 6:
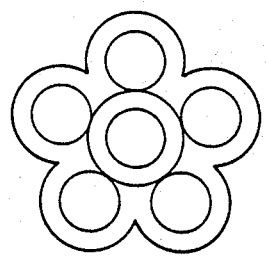
Figure 7:
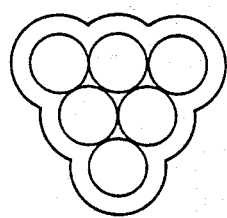
Figure 8:
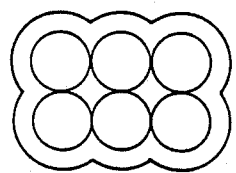
Figure 9:
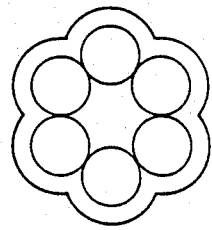
Figure 10:
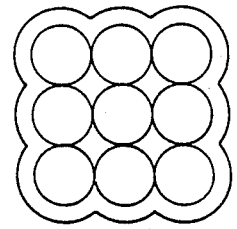
Figure 11:
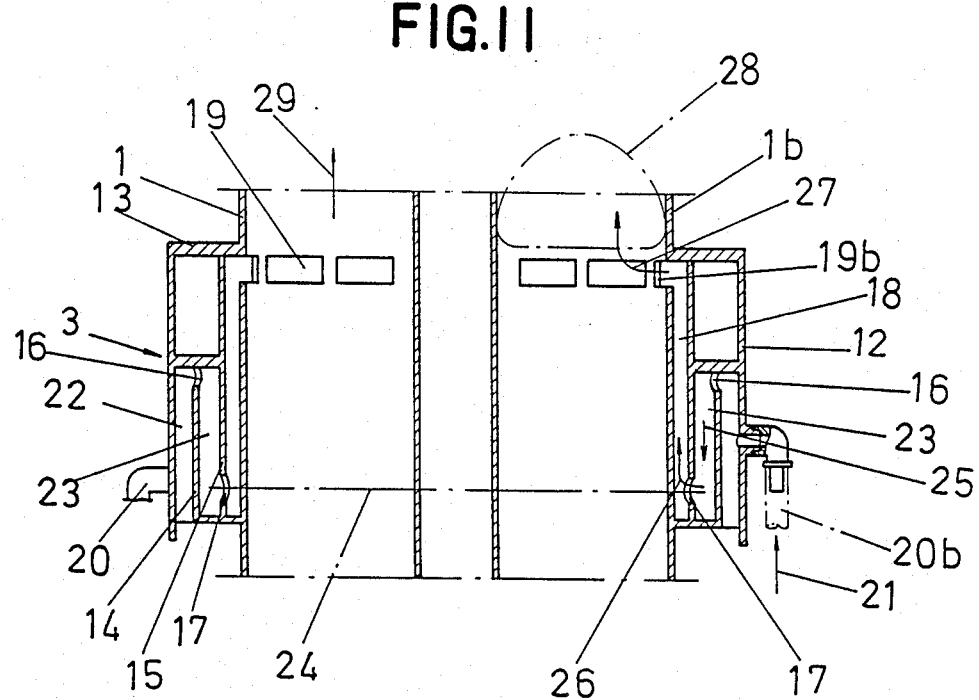
FIGS. 11 through 13 are enlared sectional views illustrating the different constructions of an air chamber for the embodiment shown in FIG. 1.
Figure 12:
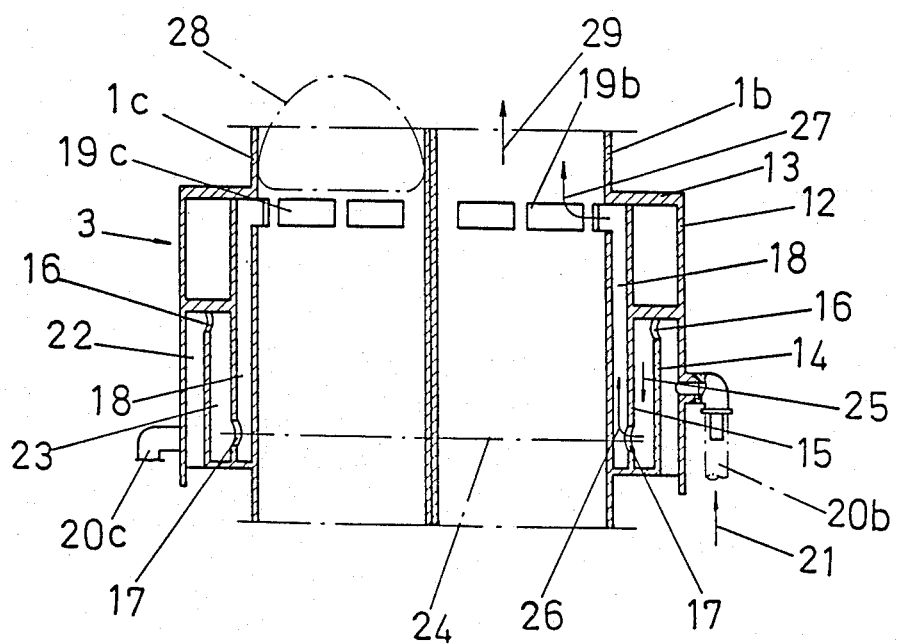
Figure 13:
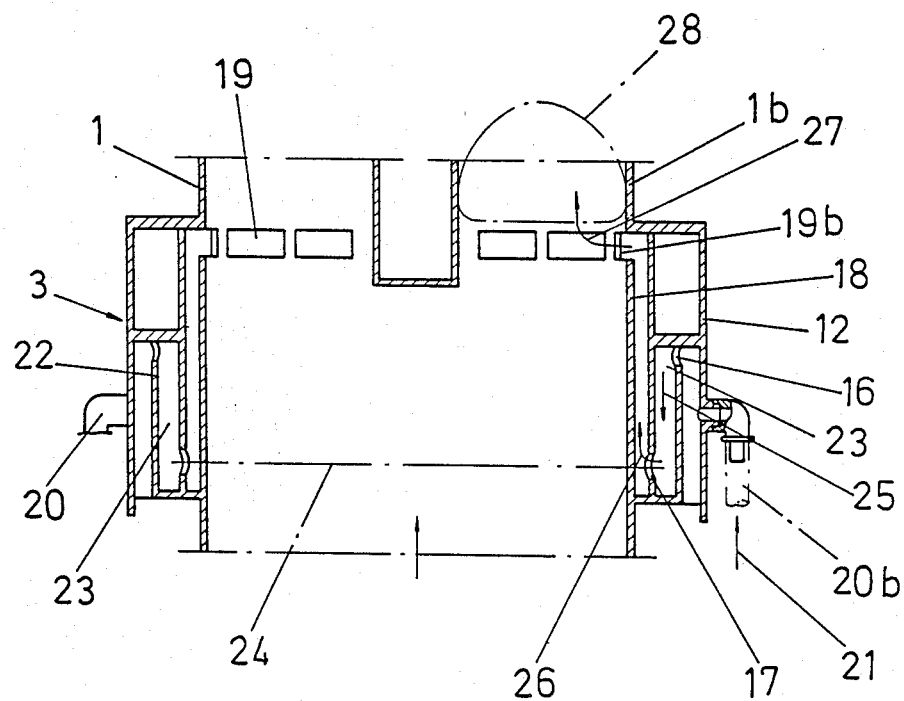

First, the embodiment shown in FIGS. 1 through 13 is described in detail. As shown in those figures, this embodiment includes many possible variations in which water passage tubes may be arranged both in different numbers and in different geometrical configurations. FIGS. 1 and 2 are a typical, basic example of those variations. Then, the following description is made by referring to the example shown in FIGS. 1 and 2. In FIGS. 1 and 2, a collective tubular casing, which is generally designated by 2, comprises a collection of smaller bore diameter tubes 1, 1a, 1b, 1c having inlets in downstream ends thereof through which water is pumped up and outlets in upstream ends thereof under the action of air supplied under pressure, and an air chamber 3 which is located below those tubes and supplies air under pressure. The air chamber 3 may be partitioned separately for each of the tubes as shown in FIGS. 11 and 12, or may be provided as a common air chamber for all the tubes as shown in FIG. 13. The detailed construction of the air chamber in both cases will be described later. The collective tubular casing 2 shown in FIGS. 1 and 2 may have many possible variations as shown in FIGS. 3 through 10. In FIG. 3, it is configured to include two tubes, as designated by 4. The variation 5 in FIG. 4 includes three tubes arranged in a triangular form. FIG. 5 shows a variation 6 in which five tubes are arranged. In the variation 7 shown in FIG. 6, six tubes are used with one center tube surrounded by the other five tubes. The variation 8 in FIG. 7 also uses six tubes, which are arranged in a triangular form. In FIG. 8, six tubes are arranged in variation 9 in two rows to form a collective tubular casing. FIG. 9 shows a varied configuration 10, which also includes six tubes arranged in a hexagonal form. Finally, the variation 11 in FIG. 10 includes nine tubes arranged in a square form. Collectively, those tubes determine the total diameter or area in cross section of a single tubular casing. Therefore, the total diameter may be increased by increasing the number of individual tubes, which may be more than nine tubes. For any number of individual tubes to be used, those tubes should be configured geometrically so that the collective tubular casing provides equilibrium and positional stability when it is actually installed deep in water.

In conjunction with the water pumping action of the various forms of the collective tubular casing described above, the construction of the air chamber which is located beneath the tubular casing is now described. In its one form, as shown in FIGS. 11 and 12, the air chamber 3 includes separate air supply compartments, the number of which corresponds to the number of the individual tubes, i.e. 1, 1a, 1b, 1c, etc. making up the tubular casing and each of which communicates with a corresponding tube. Those air supply compartments are enclosed by an outer jacket 12 which is equipped with a top end plate 13. The outer jacket 12 is hermetically mounted around the individual tubes collectively. Each of the air supply compartments is formed by cylindrical partitions 14 and 15, which are concentrically spaced apart from each other and inserted between the outer jacket 12 and its corresponding tube. As shown, for example, the cylindrical partition 14 has an air communicating aperture 16 at the upper portion while the partition 15 has an air communication aperture 17 at the lower portion. Thus, a gap or air receiving space 22 formed between the outer jacket 12 and partition 14, and a gap or air receiving space 23 formed between the partitons 14 and 15 communicate with each other through the aperture 16. Similarly, the gap or air receiving space 23 and a gap or air receiving space 18 formed between the partition 15 and the corresponding tube communicate with each other through the aperture 17. Air communication between the gap or air receiving space 18 and the corresponding tube is made through windows or apertures 19, 19b, 19c which are made in the tube. Each of the air supply compartments has an air inlet port, through which, as indicated by an arrow 21, air is supplied under pressure into the outer gap or air receiving space 22 from an air supply or suction hose 20, 20b, 20c which connects with any external compressed or pressurized air supply source, such as an air compressor. The air under pressure passes through the inlet port and is drawn into the gap or air receiving space 22 and then through the aperture 16 into the gap or air receiving space 23. During the time that the air supply continues to take place, the air is gathering upwardly inside the gaps or air receiving spaces 22 and 23 and the water level inside these gaps or air receiving spaces is gradually lowered under the action of the expanding volume of air.

When the above water level has been lowered down to the broken lines 24 where the aperture 17 is located, the air mass filled inside the gaps or air receiving spaces 22 and 23 is siphoned in the direction of an arrow 25, since the gap or air receiving space 22 is in fluid communication with the water to be circulated at a position lower than the aperture 17, which allows the gaps or air receiving spaces 22, 23 and 18 to be filled with water as the air mass is pulled by a siphon effect through the gaps or air receiving spaces 22, 23 and 18. The air mass passes through the aperture 17 to flow upwardly in the direction of an arrow 26 and then through the aperture 19b to flow into the tube as indicated by an arrow 27. The air flow into the tube then forms into a single air mass like a bullet shape 28, and rises upwardly through the tube. As the air mass is rising, the portion of water above the air mass is lifted or boosted, and the portion of water located below the air mass is placed under the suction action of the air mass and is pumped upwardly. As long as the compressed air continues to be supplied into the air chamber, air masses are successively formed inside the tube at time intervals (such as every thirty seconds) and intermittently pass through the tube to effect a lifting and suction action on the water above and below each respective air mass. Thus, those portions of water are intermittently raised at periodic time intervals. In fact, when a given air mass is rising through the tube toward the surface, the water flow through the tube under the air mass suction is initially being raised at the same speed as the rising speed of the air mass. When the air mass reaches the surface and appears in the atmosphere above it, the water flow through the tube has its inertia action and its rising speed becomes slightly slower. Thus, this change in the water flow speed causes intermittent jets of water, rather than a constant flow of water, when it is getting out of the tube. The jets of water produce water rings over the surface, diffusing effectively in radial directions. Thus, a large sphere of convection is formed around the collective tubular casing, and water circulates between the surface and the depth (such as a depth of 30 m and more). This enhances the capability of the single collective tubular casing, allowing it to handle 10 million tons of water at one site.

FIG. 13 shows a variation of the air chamber 3 in FIGS. 11 and 12, which provides a common air chamber for all of the individual tubes 1, 1a, 1b and 1c. A single air supply room is provided below the bottom ends of those tubes, and communicates with each of the tubes. As shown, the flow of air supplied through the apertures 19b, etc. gathers upwardly in a single area which has a diameter substantially equal to that of a single tubular casing. Then, the air flow is distributed into each individual tube, rising through it toward the surface and forming an air mass. Thus, water is drawn into the single area under the suction action of those air masses, and is also distributed into each tube. Thereafter, the water circulates as described for the air chambers in FIGS. 11 and 12.

Figure 16:
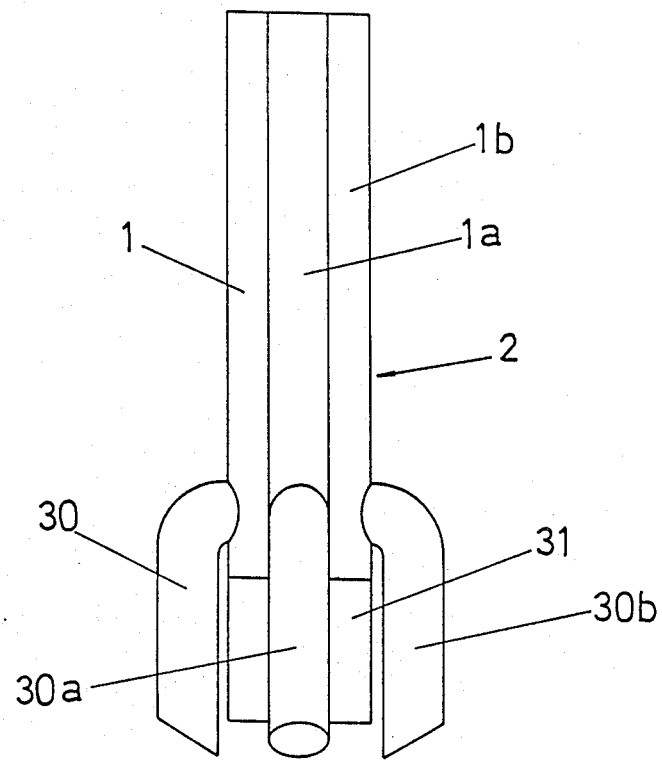
FIG. 16 is a front elevation of a variation of the two preceding embodiments.
Figure 17:
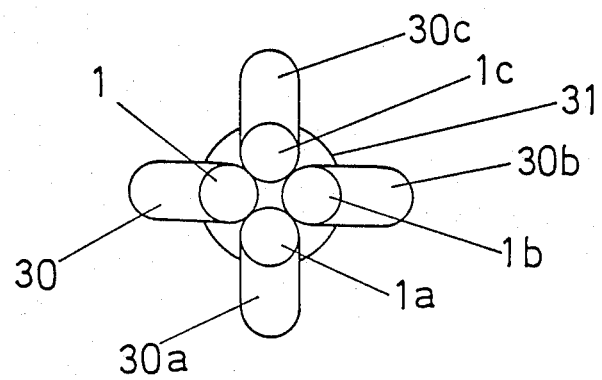
FIG. 17 is a plan view of the variation in FIG. 16.
Figure 18:
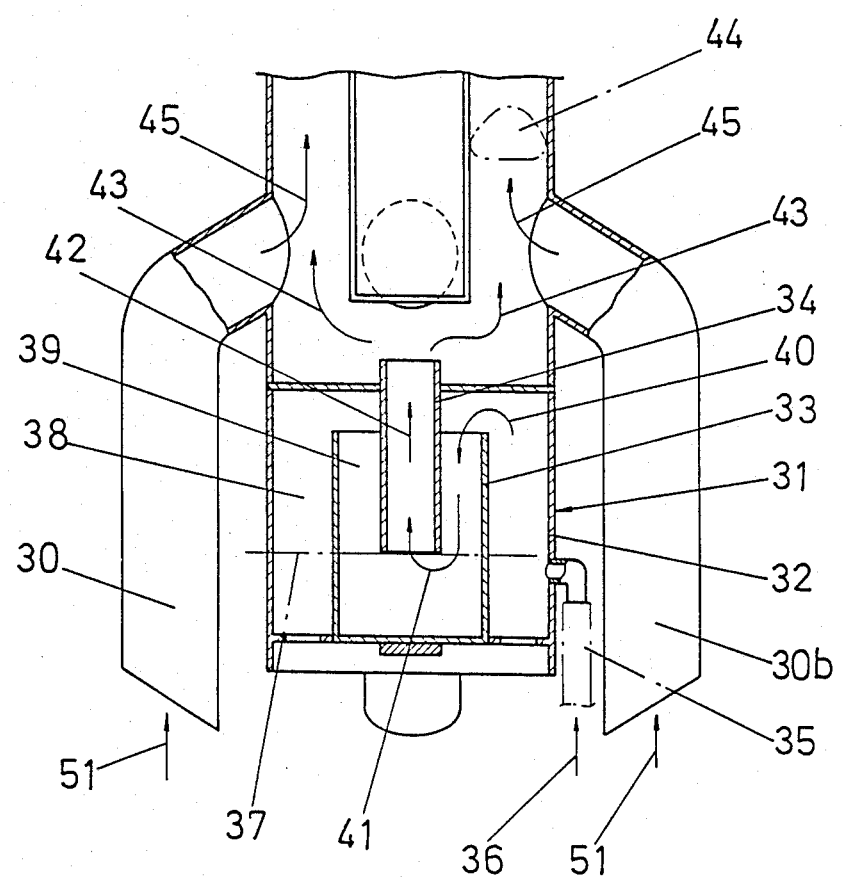
FIG. 18 is an enlarged sectional view of an air chamber for the variation of FIG. 16.

A varied form of the collective tubular casing described in the preceding embodiment is shown in FIGS. 16 through 18, which includes an air supply chamber whose construction differs from the preceding ones, and water suction pipes in addition to those tubes described above. For the purpose of easy comparison with the preceding embodiment, the collective tubular casing includes the same number of individual air and water passage tubes (four), but may include additional tubes. In the embodiment particularly shown in FIG. 16, the collective tubular casing 2 includes small-diameter individual tubes combined together, a common air chamber 31 which is located below the tubes and communicates with each of the tubes, and water suction pipes 30, 30a, 30b, and 30c each of which is connected with the corresponding tube. As shown particularly in FIG. 18, the air chamber 31 includes an outer jacket 32 closed at the top, an inner cylindrical partition 33 open at the top and closed at the bottom, and a tubular passage or conduit 34 which extends through the closed top of the outer jacket 32 and allows air to flow therethrough into the individual tubes. Those parts 32, 33 and 34 are arranged concentrically in spaced relationship with respect to each other. Compressed air is supplied from an air supply or suction hose 35 into the air chamber 31 as indicated by an arrow 36, and gathers upwardly in the air chamber 31. As the air supply increases the water level in the air chamber decreases down to the position where the bottom open end of the tubular passage 34 is located. This allows the air in the chamber 31 to flow by a siphon effect through gaps 38 and 39 and then through the tubular passage 34 as indicated by arrows 40, 41, and 42. After the air passes through the tubular passage 34, the air flow enters the space below the individual tubes, and is then distributed into each of the tubes, as indicated by an arrow 43. The portion of air in each tube forms into an air mass like a bullet shape 44, rising through the tube toward the surface. This causes water to be drawn through the water suction pipes 30, 30a, 30b, and 30c into each of the tubes due to the suction of the air masses, as indicated by an arrow 51. Then, as the air masses continue rising, the portion of water in each tube also rises through the tube, as indicated by an arrow 45.

The above described embodiment differs from the preceding embodiment in that the water suction occurs at several points instead of a single point and the air chamber 31 is constructed accordingly. It should be understood, however, that the function provided by the embodiment in FIG. 18 is the same as that in the preceding embodiment.

Figure 14:
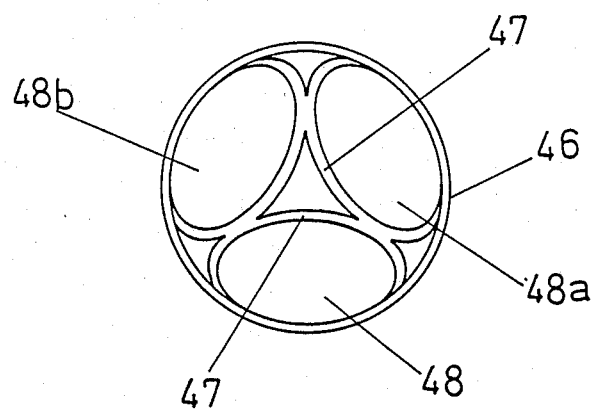
FIG. 14 is a plan view of another embodiment including a larger diameter tubular casing internally divided into three smaller diameter longitudinal passages of an elliptic cross section.
Figure 15:
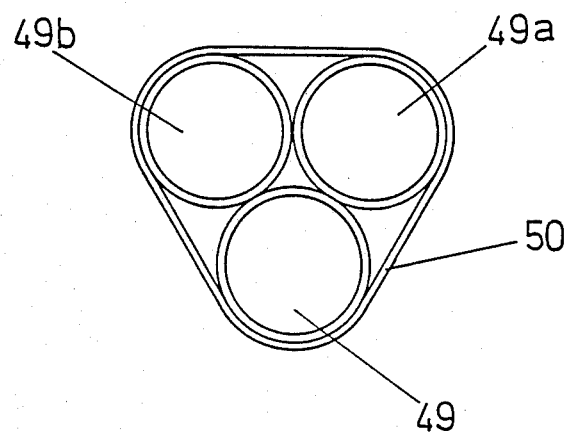
FIG. 15 is a plan view of still another embodiment including three individual small-diameter tubes bound together.

The air and water passages making up the tubular casing may be varied as shown in FIGS. 14 and 15. In FIG. 14, the interior of a larger-diameter tubular casing 46 is equally divided into three separate portions 47 which are formed like an arc shape, and three smaller-diameter elliptical shaped tubes 48, 48a, and 48b forming the air and water passages are provided longitudinally. In FIG. 15, three smaller-diameter tubes 49, 49a, and 49b are bound by ropes 50, forming a collective tubular casing. In either case, the air chamber as described in the preceding embodiments may be used.

A further variation of the collective tubular casing shown in FIGS. 19 and 20 includes an air chamber that is located between four individual small-bore diameter water passage tubes and an additional water suction pipe that extends below the air chamber. In its specific construction, the air chamber 53 is formed below the lower ends of the individual water passage tubes 54, 54a, 54b, and 54c so that it can communicate with each of those tubes for supplying air under pressure, and the water suction pipe 54 extends below the air chamber, through which water rises under the suction effect of the air supplied from the rising air chamber. The length of the water suction pipe may be determined, depending upon the depth of the water in which the tubular casing is actually to be installed.

This construction described above is particularly useful in allowing deep waters, such as dam installations and lakes and marshes, to be aerated. For any lake which is 80 m deep, for example, the construction that includes the four tubes of 30 m and the water suction pipe of 20 m length may be used. This specific construction of tubular casing may be installed so that the top ends of the tubes are located at a depth of about 5 m to 10 m beneath the water surface, and air may be supplied under a low atmospheric pressure equivalent to about 2 atms. Under these conditions, the portion of water which is located 50 m to 60 m deep can effectively be subjected to aeration. The fact that air can be supplied under such low pressure allows for the use of any low-pressure air supply equipment. The use of the low-pressure air supply makes the total system including the other accompanying equipment less costly than using an air supply under high-pressure. This also reduces any difference in the air volumetric capacity between the air chamber and the upper portions of the individual tubes. As such, the operation can continue smoothly.

Figure 19:
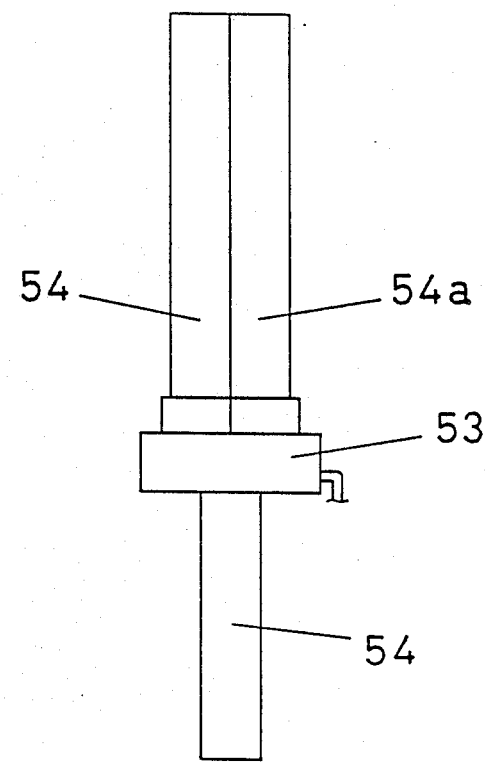
FIG. 19 is a front elevation of a variation of the tubular casing in which the air chamber is located between the individual tubes and the additional water suction pipe that extends below the air chamber.
Figure 20:
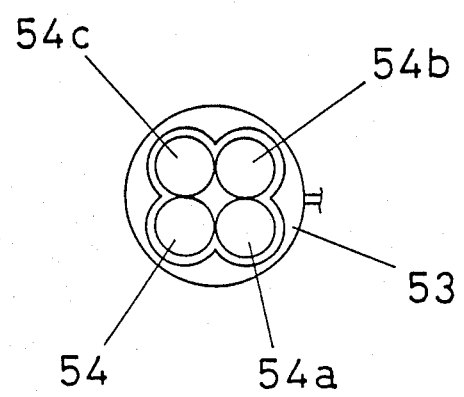
FIG. 20 is a plan view of the variation of FIG. 19.
Figure 21:
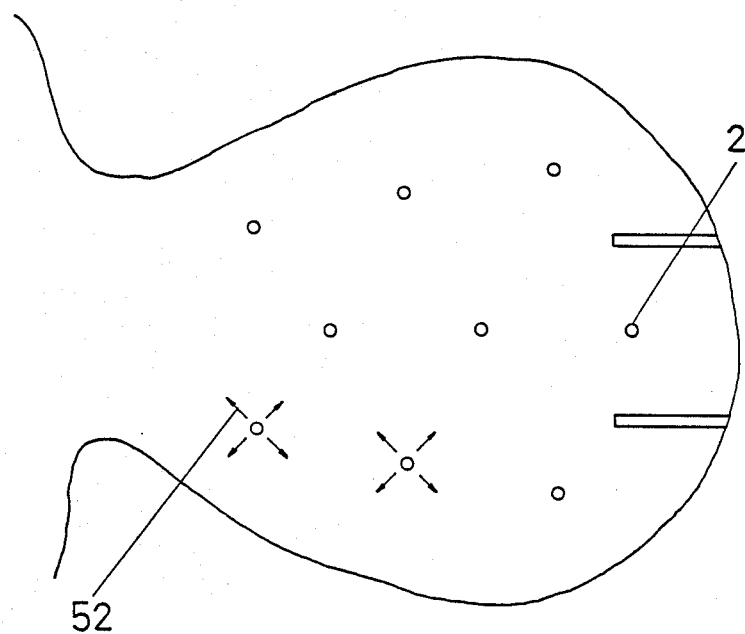
FIG. 21 is a plan view illustrating an example of how the tubular casings are installed at different locations in a sea port or bay.

The constructional and operational features of the various forms of the collective tubular casing according to the present invention have been described, and in order to help better understand those features, a typical example of actual usage of any of those forms is now illustrated by referring to FIG. 19. FIG. 19 shows the example in which several tubular casings 2 are to be installed at appropriate intervals in a sea port or bay in cold climate regions. When any of those collective tubular casings is installed, it is placed in its vertical position deep into the water, with its bottom end located near to the bottom of the water and its top end located at a depth of about 5 m beneath the water surface. Then, compressed air is introduced into the air chamber from any external air supply source such as an air compressor. The air gathers upwardly in the air chamber and then is released from the air chamber, flowing into the individual tubular passages usually in the form of tubes. As the air is rising through each of the tubular passages, it forms into an air mass like a bullet shape. Following the first air mass, another air mass is formed in the same manner as described above. Thus, the portion of water which is sandwiched between the preceding and following air masses is rising through the tubular passages under both the suction and flotation or boost actions of the air masses. That portion of water located near the bottom of a body of water contains less oxygen is raised or lifted toward the surface, from which it is jetted and diffused in radial directions as indicated by an arrow 52. Then, the portion of water located on the surface and containing enough oxygen is in turn being lowered toward the bottom under the action of the produced convection. Exchanging those portions of water between the bottom and surface improves the oxygen content in the water rapidly. This water circulation by convection also provides an effective anti-freezing means. Since the portion of water located near the bottom is usually maintained at a temperature of 4° C. at the lowest, the water at the surface can also be maintained at a temperature of 4° C. or higher by causing the water to circulate by convection between the bottom and surface.

Although the present invention has been described by way of the several preferred embodiments thereof, it should be understood that various changes and modifications may be made without departing from the spirit and scope of the invention.

What is claimed is:

1. A water circulation apparatus comprising:
    a tubular casing having a plurality of tubular passages extending along the entire length of said tubular casing and said plurality of tubular passages being open at each end thereof; and
    means for forming large intermittent air masses which pass through said tubular passages when said tubular casing is erected in a body of water, said means including an air supply chamber disposed at one end of said tubular casing, said air supply chamber being divided into a first air receiving space and a second air receiving space, said first air receiving space being in fluid communication with said tubular passages and with said second air receiving space, said second air receiving space adapted to receive air from an external air supply source and having an opening for fluid communication with a body of water to be circulated;
    whereby air supplied to said second air receiving space intermittently accumulates in said first and second air receiving spaces until an air mass having a predetermined volume is formed, at which point the air mass is in fluid communication with said tubular passages and passes through said tubular passages in a bullet shape to effect a lifting action on water above the air mass and a suction action on water located below the air mass to pump up water through said tubular passages.

2. The water circulation apparatus of claim 1, wherein said tubular passages extend in a longitudinal direction with downstream ends thereof in fluid communication with said air supply chamber.

3. The water circulation apparatus of claim 1, wherein said first and second air receiving spaces are each partitioned into a plurality of air supply compartments, each of said plurality of air supply compartments of said first air receiving space being in fluid communication with both a respective one of said tubular passages and a respective one of said plurality of air supply compartments of said second air receiving space.

4. The water circulation apparatus of claim 1, wherein said air supply chamber includes an outer jacket disposed around an outer peripheral wall of said tubular casing, said outer peripheral wall of said tubular casing having at least one opening therethrough for fluid communication of said tubular passages with said first air receiving space.

* * * * *